C. E. CRANE.
ARC LAMP.
APPLICATION FILED DEC. 1, 1911.

1,071,675.

Patented Aug. 26, 1913.

Witnesses
James C. Sproll.
Clara A. Harm.

Inventor
Charles E. Crane.
By Adams & Brooks
Attorneys

C. E. CRANE.
ARC LAMP.
APPLICATION FILED DEC. 1, 1911.

1,071,675.  Patented Aug. 26, 1913.
5 SHEETS—SHEET 3.

Witnesses
James E. Sproll.
Clara A. Harm.

Inventor
Charles E. Crane.
By Adams Brooks
Attorneys

C. E. CRANE.
ARC LAMP.
APPLICATION FILED DEC. 1, 1911.

1,071,675.

Patented Aug. 26, 1913.
5 SHEETS—SHEET 4.

Witnesses
James E. Sproll.
Clara A. Harm.

Inventor
Charles E. Crane.

By Adams Brooks
Attorneys

C. E. CRANE.
ARC LAMP.
APPLICATION FILED DEC. 1, 1911.

1,071,675.

Patented Aug. 26, 1913.
5 SHEETS—SHEET 5.

Witnesses
James E. Sproll.
Clara A. Hairn.

Inventor
Charles E. Crane

By Adams & Brooks
Attorneys.

UNITED STATES PATENT OFFICE.

CHARLES E. CRANE, OF SEATTLE, WASHINGTON.

ARC-LAMP.

1,071,675.  Specification of Letters Patent.  Patented Aug. 26, 1913.

Original application filed December 14, 1910, Serial No. 597,371. Divided and this application filed December 1, 1911. Serial No. 663,447.

*To all whom it may concern:*

Be it known that I, CHARLES E. CRANE, a citizen of the United States of America, and a resident of the city of Seattle, in the county of King and State of Washington, have invented certain new and useful Improvements in Arc-Lamps, of which the following is a specification.

My invention relates to arc lamps, having more particular reference to lamps of this character employed in conjunction with projection apparatus, and has for one of its objects to provide novel electrode setting mechanism for maintaining the arc in substantially a predetermined position.

The invention has for a further object to provide means for trimming arc lamp electrodes.

With the above and other objects in view, to be referred to as my description progresses, my invention resides in the features of construction, arrangements and combinations of parts hereinafter described and succinctly defined in my annexed claims.

Referring to the accompanying drawings wherein like numerals of reference indicate like parts throughout.

Referring now by numerals of reference to the drawings illustrating my present invention in conjunction with novel display apparatus covered in my application Serial No. 597,371, filed December 14, 1910, of which this is a division, 1 indicates a plurality of projecting devices, each of which is designed to project a light beam onto a respective screen or receiving surface, and with these devices suitable conveyers 2 are associated for the exhibition of their contents on the several screens successively. Conveyers 2, of which there are nine shown, are mounted in a circular series on a carrier 3, supported for rotation on a suitable frame or base 4, this carrier also forming a means of support for the projecting devices 1, of which there is one provided for each conveyer 2, this arrangement by which the projectors and their related conveyers for the matter to be displayed move in unison, insuring of perfect relative positioning of these parts at all times, as will be readily understood. For operating carrier 3 intermittently, to thereby enable me to obtain pauses or intermissions in its action of predetermined length, I employ suitable power transmission mechanism now to be described.

Reference numeral 5 indicates a rotatable operating member or pin wheel whose extensions or pins 5′ are adapted to engage studs 12, conveniently provided in circular series on an outwardly projecting annular base extension 3′ of said carrier, such driving connection enabling play between the parts whereby said carrier can continue to revolve after a pin 5′ has wiped from a stud 12 thereof until it is again locked by a device 6, and member 5 can move independently during the initial part of each step or operation thereof, to release said locking device 6. Locking device 6, as now considered, comprises a pin slidably engaged in an aperture 4' of base 4 for reception in seats or depressions 7, each associated with a respective stud 12 and formed in the under face of base extension 3', the said pin being yieldingly held in operative position by an arm 8 on which it is mounted, the said arm being pivotally supported, as shown, on base 4, and normally held in elevated position by a spring 9.

Reference numeral 10 indicates a push pin, for releasing the locking pin, the same being connected to arm 8 and having its free end portion lying in the path of cams 11, depending from the lower face of wheel 5. These cams, of which there is one for each pin 5' of wheel 5, are so positioned with relation thereto that a cam depresses push pin 10, thereby freeing carrier 3 from locking device 6, as hereinbefore referred to, prior to its related pin engaging a stud 12 of the carrier. Immediately upon a pin 5' wiping from the stud engaged, driving of member 5 is terminated and, if desired the momentum thereof may be promptly arrested by a spring pressed brake shoe 28 engaged with the hub thereof, but carrier 3 continues to revolve until it has traversed its full step, which, as now considered, is a one-ninth part of a revolution, at which time locking pin 6 seats itself in the next seat 7, as will be readily understood.

Wheel 5 is fixed to a vertical shaft 13, suitably journaled in frame or base 4, as shown, which shaft has releasable connection through the pawl and ratchet device 14 with an operating drum 15 loose on said shaft. A weight 16, provided on the free end portion of a flexible connection 17 passing over a guide sheave 18 and secured to drum 15, is released automatically and in falling serves to operate said drum to thereby impart a step to the operating member 5.

For rewinding connection 17 after each operation, I employ a winding mechanism comprising the meshing spur gears 19 and 20, the former of which is loose on shaft 13, and the latter fixed to a driven shaft 21, suitably mounted for rotation in base 4 and a depending bracket 22 thereof, and provided with a ratchet wheel 29 engaged by a pawl 30 on base 4 for preventing backward rotation of said shaft. This winding mechanism is adapted to be connected to drum 15 through the medium of a clutch comprising the normally engaging parts 23, 23', the latter of which is in the form of a circular series of teeth or projections, provided on the interior of drum 15, between which a finger 24 of clutch part 23 is adapted to egage to thereby connect the drum to receive movement from gear 19, during which movement of said drum the pawl of the device 14 thereof rides idly over the teeth of its related ratchet wheel. Clutch part 23 is splined on the depending hub part 19' of gear 19, so as to be held for rotation with the latter while being permitted to have relative longitudinal movement thereon, which latter movement is effected by a shifter 26, controlled from flexible connection 17, the said shifter being in the form of a bell crank-lever, fulcrumed, as at 26', and having forked end portions, the lower of which straddles connection 17 so as to lie in the path of respective shoulders or strike parts 27, 27' thereof, while the upper engages freely in a circumferential groove of the clutch part, as is well understood. By such arrangement of parts, during lowering movement of weight 16, strike part 27' engages shifter 26 and swings the same to effect the lowering of clutch part 23 into operative connection with clutch part 23' this occurring coincidently to the disengagement of the active pin 5' of wheel 5 from a stud 12, as previously described, to thereby terminate the driving action of said drum, and connect the latter with gear 19, which latter will then operate until strike part 27 moves shifter 26 in the reverse direction to thereby disengage the said clutch parts, whereupon the drum will be free to operate in its driving capacity as before, to, through the intermediacy of member 5 advance carrier 3 another step. As now considered, a spring catch 25 is adapted to engage shifter lever 26 and thereby prevent accidental lowering of clutch part 23. Gear 20 is provided on its upper face with a circular series of pins 31 arranged to be successively engaged by a depending strike lug 32, provided on a worm wheel 33, by which latter it is operated intermittently, the same, as now considered, being adapted to be operated two steps, this requiring two complete revolutions of worm wheel 33, to bring strike part 27 into position to release shaft 13 from clutch parts 23, 23', as hereinbefore set forth.

Carrier 3 comprises a cylindrical body $3^x$ supported, through engagement of its external base extension 3', on a series of balls 34, mounted in a race way of base 4, as shown, for rotation about a hollow cylindrical rotator 35, which latter projects through and is journaled in an opening 35' of base 4, and provided on its projecting lower end portion with worm wheel 33. A convenient manner of mounting rotator 35 consists in providing the same with an offset external annular flange 36, which latter engages over an internal flange 37 of body portion $3^x$ of the carrier and has bearing on a series of balls 38, mounted in a suitable groove formed in the upper face thereof.

Figure 12:
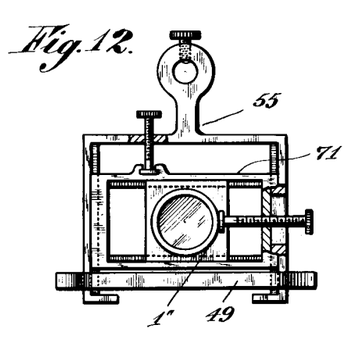
Fig. 12 is a rear elevation of one of the projectors and the supporting frame therefor.
Figure 13:
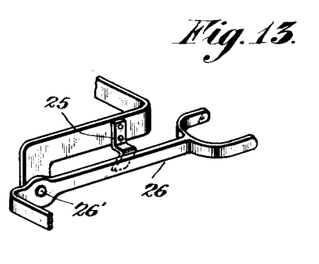
Fig. 13 is a detail perspective of the clutch shifter included in the carrier driving mechanism, and the catch therefor.

Within carrier body $3^x$ I provide an electric arc light 41, this being arranged centrally therein so that its rays fall upon all of a concentric series of condensers 1' conveniently mounted in openings suitably provided in the upper portion of the wall of the carrier body $3^x$, and combined with outwardly spaced projectors $1''$, of any suitable or well known type, to thereby provide the exhibiting or projection devices, each of which is associated with a respective conveyer 2, for movement of the slides thereof in front of its condenser. Projectors $1''$ are adjustably mounted for movement toward and from their related condensers, by hangers 55 slidably engaged on radial arms 54 of carrier 3. Projectors $1''$ are adjustably mounted in slide frames 71 (see Fig. 12) of hangers 55 to secure their proper alinement with their related condenser, as is well understood.

Conveyers 2, which are in the form of endless belts, preferably of spring sheet metal, and inclined outwardly in a downward direction so as to prevent interference of their outer portions to the proper projection of the subject matter of the slides positioned in the projecting devices, lead around respective sets of pulleys 42, arranged in substantially rectangular relation, and journaled on frames 43 of carrier 3, one pulley of each set being carried by a respective drive shaft 44, journaled on the carrier body $3^x$, by being removably engaged on the squared upper end portion thereof, as clearly shown. Frames 43 with their conveyers constitute similar removable units by which the ready substitution of new series of slides is permitted. A convenient arrangement of supporting these frames consists in removably securing the same at an intermediate point to brackets 46 and providing their inner end portions with spaced extensions 45 which are engaged in external seats 39 of carrier body $3^x$.

Mounted on conveyers 2 and spaced in the direction of the length thereof, are supports 47 for the holders 48 for the usual plates, containing a white or colored transparency to be projected, the said supports comprising side plates $47'$ connected at one end portion by a cross pin 50 and fixed to stems $47''$, secured to conveyers 2, in any suitable manner and adapted for engagement with a cam track or guide 49 carried by hangers 55 and projecting from the sides thereof, the said cam track thereby serving to right or to position the holders in a vertical plane, as they approach the projection device, conveyer 2 bending freely to permit of this action, so that their subject matter will be properly displayed.

Figures 10, 11:
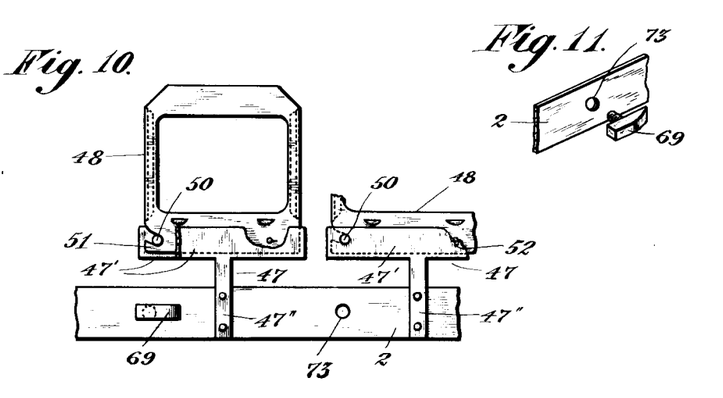
Fig. 10 is an elevation of a portion of one of the conveyers.
Fig. 11 is a fragmentary perspective of a portion of a conveyer belt and a cam lug thereof, the latter being removed from its seat.

Plate holders 48, (see Fig. 10,) which are provided with suitable side flanges to form a seat for the plate, have their lower portions or shanks engaged between the side plates $47''$ of supports 47 and removably held as by a tongue 51 thereof and a lug 52 of one of said side plates, the former engaging under cross pin 50 and the latter in a depression or seat of the shank of holder 48, as clearly shown.

Each conveyer 2 is provided with novel driving and timing mechanism and these being identical in construction, a description of one will therefore suffice.

In providing the driving mechanism for a conveyer, I mount on the drive shaft 44 thereof a loose drum 56, the latter having releasable connection therewith through a pawl and ratchet device 57, for transmitting power thereto imparted by a weight 58, which latter is secured to a flexible connection or cord 59, leading over an idler 60, journaled on the adjacent bracket 46, and secured to the drum. For operating drum 56 for winding flexible connection 59 to thereby lift weight 58, during which operation the said drum turns on its shaft, I provide coöperating elements on said drum 56 and rotator 35 respectively, the same consisting of an arm 63 which is secured to an internal gear $63'$, connected to drum 56, as hereinafter set forth, and projecting through an aperture $3^a$ of carrier body $3^x$ into the path of a series of strike lugs 67 to be moved by the latter successively a distance less than one half that of the spacing of suitable pins 65, hereinafter referred to. Internal gear $63'$ is loose on shaft 44 and connected by pinions $63''$, journaled on a bracket arm $63^a$ of carrier body $3^x$, with a gear $63'''$ of drum 56, to obtain a relatively increased throw of the latter over arm 63, to thereby enable weight 58 being lifted a distance corresponding to the spacing of plate holders 48 on a conveyer. Strike lugs 67 extend in spaced relation circumferentially of rotator 35, and successively engage arm 63 to advance the same to thereby lift weight 58, said lugs being adapted to wipe off the free end of said arm when the latter is adjusted into engagement with a catch 61, under control of my improved timing mechanism which I will now proceed to describe.

Catch 61, is pivotally carried on an oscillatory support 62, pivoted, as at $62'$ to carrier 3, which support is moved by rotator 35 under control of conveyer 2 to effect the release of arm 63, whereupon it is operated by weight 58 to rotate shaft 44 one step and thereby adjust conveyer 2 to position the next slide in front of condenser $1'$. For controlling the release of arm 63, I pivotally mount on support 62 an actuating device 64 having arms $64'$, $64''$, arranged side by side with a spacing which is less than one half that of the spacing of pins 65, of which there are ten provided on the upper edge of rotator 35 and into the path of which said arms are adapted to be alternately positioned. A spring 66 tends to normally hold actuating device 64 with its forward arm, (arm 64') lowered, and when thus held said arm will be successively engaged by the pins 65, to communicate the movement of the latter to support 62, such movement of the support being sufficient to effect the withdrawal of catch 61 from over arm 63, the latter being conveniently held during this operation against movement with the support through engagement thereof with the wall of the lower portion of aperture 3$^a$, which as will be observed, is of less width than the upper portion in which actuator 64 moves. Pins 65, are arranged to alternate with respect to strike lugs 67, with suitable spacing, as shown, to permit of arm 63 returning to normal position, wherein it bears on the opposite side wall of aperture 3$^a$, prior to the succeeding strike lug 67 reaching that point.

Figure 1:
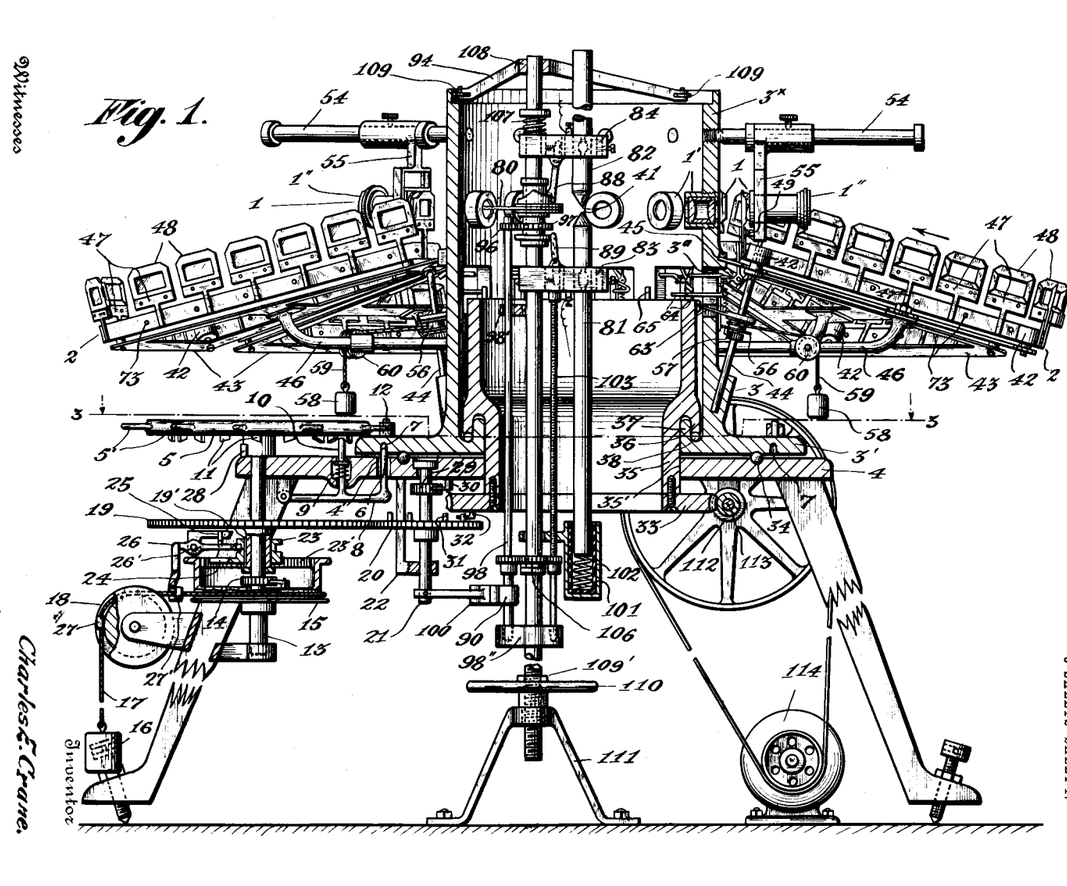
Figure 1 is a vertical section of a projection apparatus equipped with my present invention.
Figure 2:
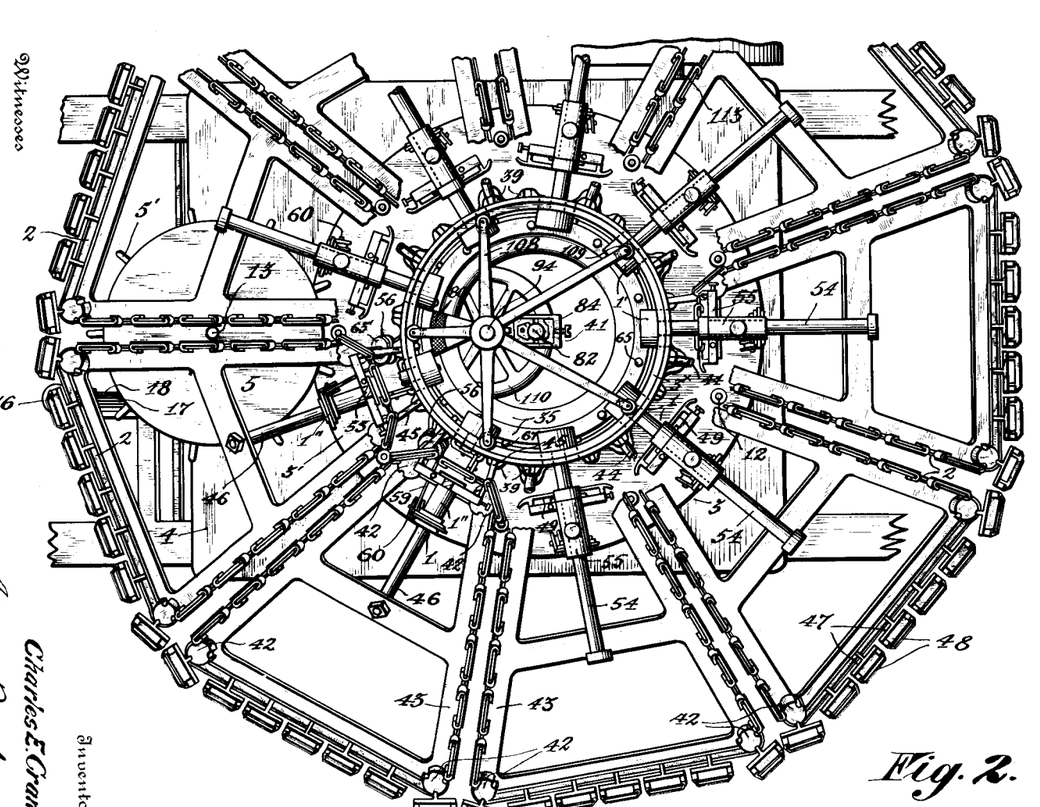
Fig. 2 is a fragmentary top plan thereof, portions of some of the display matter conveyers and the adjacent underlying parts being broken away.
Figure 3:
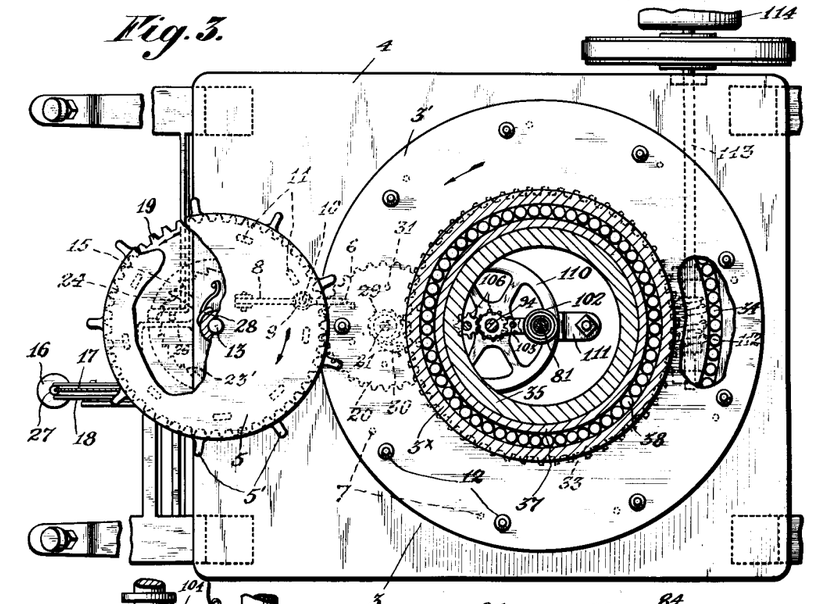
Fig. 3 is a horizontal section taken on line 3—3 of Fig. 1 parts being broken away.
Figures 4, 6:
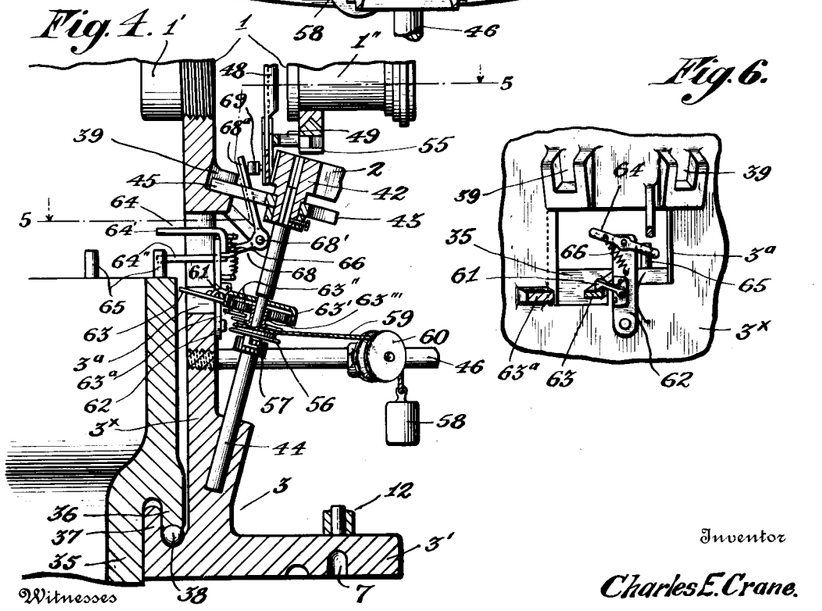
Fig. 4 is a fragmentary vertical section taken through one side of the carrier.
Fig. 6 is a fragmentary side elevation, illustrating more particularly the catch and associated release control mechanism for the operating mechanism of a conveyer.
Figure 5:
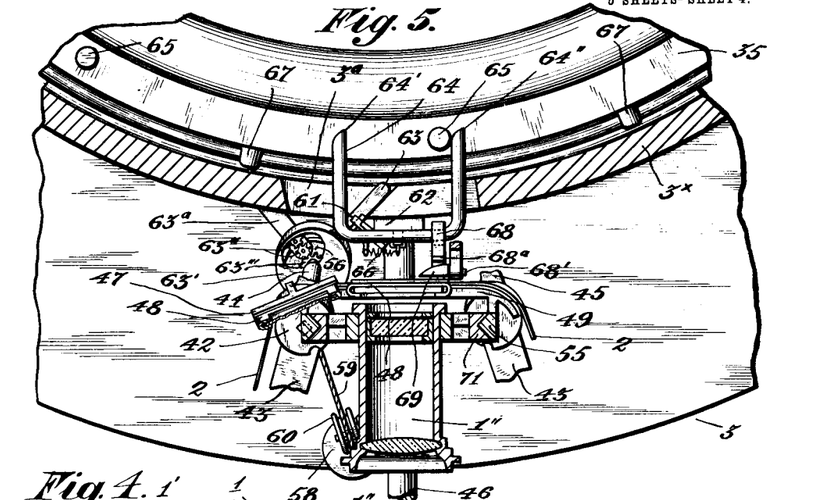
Fig. 5 is a horizontal section on line 5—5 of Fig. 4.

The setting mechanism for controlling actuating device 64 comprises an angular lever 68, which is fulcrumed at 68' on carrier body 3$^x$ and having its lower arm forked to straddle device 64 on one side of its fulcrum and its upper arm 68$^a$ extending alongside conveyer 2 where it can be engaged by suitable cam lugs 69, which serve to swing said lever to the position shown in Figs. 4 and 5 and thereby cause the lowering of actuator arm 64'' with a corresponding upward movement of arm 64'. Cam lugs 69 are adapted to be removably mounted on conveyer 2, the same being intended to be employed only when it is desired to lengthen a period or periods of exposure over that for which the apparatus is normally set, and as now considered having threaded shanks adapted to be mounted in suitable internally threaded seats 73 of the conveyer, which seats are provided in proximity to respective plate holders 48, so that when a cam lug 69 is provided, the same will engage and operate lever 68 simultaneously with the exposure of the plate in the adjacent or related plate holder 48. The adjustment of actuator 64 by a cam lug 69, as previously described, obviously lowers arm 64'' prior to the passage thereby of the pin 65 which has just previously engaged arm 64' to effect the release of the mechanism for operating the conveyer and while support 62 must necessarily be oscillated at such time to permit of the passage of the said pin, such movement will be an idle one inasmuch as it occurs prior to the advancement of arm 63 by the succeeding lug 67. The release of the conveyer operating means will therefore take place through the action of the next pin 65 on said arm 64'', after which, unless another cam lug is encountered, actuating device 64 is returned to normal position, that is, with arm 64' lowered, by spring 66 so as to lie in the path of the pin 65, whereupon it will be operated by the pin immediately following the one which has just previously engaged arm 64'', thereby obtaining a relatively short period of exposure for the slide immediately following the one exposed for the long period, as just described.

In connection with the mechanism hereinbefore described, I provide novel mechanism for maintaining the arc light 41 central in a vertical direction with respect to condensers 1', this mechanism comprising a setting table 80, which is adapted to be moved between carbons 81 and 82, held in clutches 83 and 84 respectively, which clutches are controlled automatically to release their carbons upon presentation of said table 80 therebetween, so that said carbons through engagement with this table will be set.

Figures 7, 8, 14:
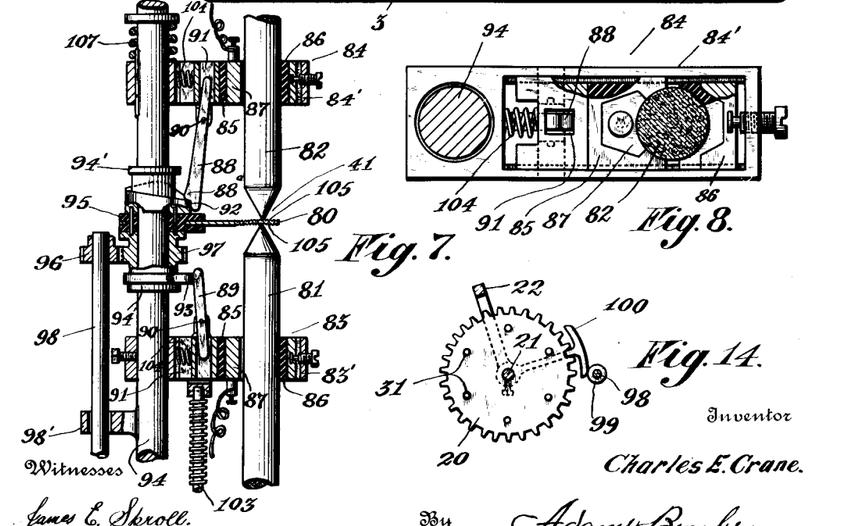
Fig. 7 is a fragmentary vertical section of my carbon controlling mechanism illustrating the clutches adjusted to release the carbons.
Fig. 8 is a detail plan of one of the carbon clutches, having a carbon mounted between its jaws.
Fig. 14 is a partial section illustrating more particularly the intermittently operated friction drive.

Clutches 83 and 84, the former of which is fixed and the latter adjustably held above the same on a stationary shaft 94, conveniently comprise suitable open frames, as 83', 84' respectively (see Figs. 7 and 8) in which jaws 85, 86 are mounted, these jaws having facings of suitable insulating material on their opposing faces, as shown, in one of which facings of each pair of jaws I mount an electrode, as 87, which electrodes are, in practice, connected with a suitable source of electrical energy, in any well known or preferred manner. Jaws 85 are slidably mounted in the clutch frames and are controlled, one by a shifter lever 88 and the other by a shifter lever 89, these shifter levers being connected to said jaws 85, as by having their one end portions engaged in suitable seats or apertures 91 thereof. Intermediate their ends, levers 88 and 89 are fulcrumed, as at 90 on the adjacent clutch frames and have their free end portions extending toward table 80 and engaged with cams 92 and 93 respectively. Cams 92 and 93 are mounted to turn freely on shaft 94 between annular shoulders 94' thereof and are connected by a suitable coupling member 95, of insulating material to move simultaneously with setting table 80. A pinion 96, meshing with a spur gear 97, fixed on the hub of cam 93, and fixed to a drive shaft 98 communicates movement to cams 92 and 93 and table 80. Shaft 98 is mounted in suitable bearings 98', 98'' of shaft 94, the latter of which is in the form of a step, and is connected by a friction drive with shaft 21, this friction drive comprising a friction wheel 99, fixed to said shaft 98 and lying in the path of a friction segment 100, which latter is fixed to shaft 21 and is designed to convert one step of wheel 20 into a complete rotation of shaft 98. Through gears 96 and 97 such movement of shaft 98 is communicated to table 80 to impart a complete revolution thereto by a series of steps, during one of which said table moves entirely between carbons 81 and 82, this operation occurring simultaneously with an adjustment of carrier 3. As table 80 moves between carbons 81 and 82, cams 92 and 93 swing levers 88 and 89 to adjust jaws 85, thereby opening clutches 83 and 84 and holding them open until the table is about to be withdrawn, when said jaws will be closed by springs 104. When released, said carbons move into engagement with table 80, the upper of these carbons lowering by gravity while the lower carbon is elevated by a suitable spring lift 101, the latter engaging the lower end portion of said last named carbon and being arranged in a carrier 102, slidably mounted on fixed shaft 94 and connected for adjustment by a feed screw 103.

In accordance with my invention, I trim the carbons 81 and 82 and, as now considered, the trimming operation is effected simultaneously with the setting of said carbons by providing cutting or filing sections 105 on the upper and lower faces of table 80 which are conveniently provided by forming the latter with sharp edged furrows or teeth in the path of the carbons.

Figure 9:
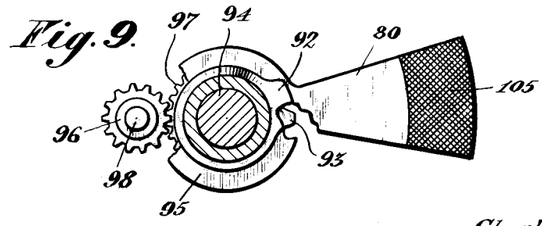
Fig. 9 is a plan illustrating more particularly the carbon centering table, and the carbon clutch operating cams, with a portion of said table broken away.

A train of gears 106, comprising an intermediate gear journaled on shaft 94, and end pinions meshing therewith and fixed on screw 103 and shaft 98 respectively, serves to drive screw 103, by which latter carrier 102 is advanced to place spring 101 under tension after each release operation thereof, wherein it lifts the lower carbon, as hereinbefore explained. Through operation of cam 93, clutch 83 is closed immediately following the elevation of its carbon 81 by spring 101. Cam 92 however, differs from cam 93 in that it is formed to maintain clutch 84 open for a relatively long period of time, and further, has its upper edge portion inclined (see Figs. 7 and 9), to provide a cam track on which an angular shoulder 88ª of lever 88 rides. By this arrangement, carbon 82 is permitted to lower by gravity into contact with carbon 81 subsequently to the withdrawal of table 80, immediately following which, clutch 84 being now closed, said carbon is elevated to form or draw the arc, as is well understood.

Reference numeral 101 indicates a radial-armed support for the upper end portion of shaft 94, the same being steadied through engagement of roller 109 provided in the outer end portions of its arms, which have bearing against the inner face of carrier 3. Shaft 94 is mounted on a stand 111 by an internally threaded member 109', consisting of the hub portion of a hand wheel 110, which is rotatably seated on said stand and engaged on the threaded lower end portion of said shaft to thereby permit of vertical adjustment of said shaft, as may be required to obtain the proper relationship between the arc light mechanism and projection devices 1.

In the operation of the display apparatus, desirably a series of elevated screens or receiving surfaces (not shown), of any suitable construction, as for example, an opaque glass construction, are provided to extend in concentric outwardly spaced relation to the apparatus, and such series of screens can correspond in number to the projecting devices 1, or they can be of a relatively less number, in which latter instance the series of screens will obviously not extend entirely around the apparatus and consequently some shield or guard must be provided on the apparatus or in proximity thereto to intercept the light beams and thus prevent the display of the projections during the travel of the projection devices from the last screen of the said series to the first screen thereof, as will be readily understood. By simultaneously projecting upon a series of screens arranged as just described, display matter is brought to the attention of passers by within a comparatively large area.

Rotator 35 is driven continuously, as by a worm 112 meshing with worm wheel 33, said worm being fixed to a drive shaft 113, driven, as by a suitable motor 114.

Having thus fully described my invention, what I claim as new, and desire to secure by Letters Patent of the United States of America, is:—

1. In combination with superimposed carbons of an electric arc lamp, one of which is supported for movement toward and from the other, means for trimming said last named carbon, and means for moving said trimming means between said carbons in engagement with the last named one thereof, for the purpose specified.

2. In an electric arc lamp, in combination with a carbon thereof, means releasably holding said carbon, means supported for movement crosswise of said carbon provided with a trimming part, means for automatically releasing the carbon, and means for operating said second means when its trimming part is in engagement with said carbon.

3. In combination with the carbons of an electric arc lamp, means supported for movement between said carbons for determining their relative set, said means having a trimming part for engagement with said carbons, and means for moving said first means when it is in engagement with said carbons.

4. In combination with the carbons of an electric arc-lamp, a movably supported trimming means for said carbons, said trimming means having its body portion provided on its opposite faces with cutting teeth, and means for moving said trimming means between said carbons for effecting the trimming of the latter.

5. In combination with superimposed carbons of an electric arc-lamp, a table supported for movement between said carbons, means whereby said carbons are permitted to move toward one another to engage said table, and means for moving said table when the carbons are in engagement therewith, to thereby effect a trimming of such carbons.

6. In combination with the carbons of an electric arc-lamp, a table supported for movement, means for moving the table into and out of a position between said carbons, means for causing the carbons to engage the table when the table is between the carbons, and means for moving the table between the carbons when the carbons are in engagement with the table.

7. In combination with superimposed carbons of an electric arc lamp, means for releasing said carbons to permit of their moving toward one another, setting means supported for movement between said carbons, means for positioning said setting means between said carbons prior to the release of the latter, and means whereby said carbons are adjusted to effect a parting thereof subsequently to the withdrawal of said device therefrom.

8. In combination with the carbons of an electric arc lamp, a device supported for movement between said carbons having its opposing faces provided with cutting teeth, means for releasing said carbons for movement into engagement with the cutting teeth of said device, and resilient means for moving one of said carbons into engagement with said device.

9. In combination with the carbons of an electric arc lamp, a device supported for movement between said carbons having its opposing faces provided with cutting teeth, means for releasing said carbons for movement into engagement with the cutting teeth of said device, resilient means for moving one of said carbons into engagement with said device, and means for restoring the tension to said resilient means after each operation thereof.

10. In combination with the carbons of an electric arc lamp, a device supported for movement between said carbons having its opposing faces provided with cutting teeth, means for releasing said carbons for movement into engagement with the cutting teeth of said device, resilient means for moving one of said carbons into engagement with said device, and means for restoring the tension to said resilient means after each operation thereof, comprising a carrier in which said resilient means is mounted and engaged with said carbon, and means for advancing said carrier to thereby place said resilient means under tension.

11. In combination with the carbons of an electric arc lamp, a device rotatably supported for movement between said carbons, means for releasing said carbons for movement into engagement with said device, means for rotating said device, resilient means for moving one of said carbons into engagement with said device, a carrier on which said resilient means is mounted, and means driven from said second named means for moving said carrier to thereby place said resilient means under tension.

12. In combination with the carbons of an electric arc lamp, a device rotatably supported for movement between said carbons, said device being provided on its opposite faces with cutting teeth, means for releasing said carbons for movement into engagement with the cutting teeth of said device, means for rotating said device, resilient means for moving one of said carbons into engagement with said device, a carrier on which said resilient means is mounted, and means driven from said second named means for moving said carrier to thereby place said resilient means under tension.

Signed at Seattle, Washington, this 21st day of September 1911.

CHARLES E. CRANE.

Witnesses:
 E. N. SEARS,
 ARLITA ADAMS.